US009616750B2

United States Patent
Shibata et al.

(10) Patent No.: US 9,616,750 B2
(45) Date of Patent: Apr. 11, 2017

(54) VEHICLE DISPLAY SYSTEM

(71) Applicant: KOITO MANUFACTURING CO., LTD., Tokyo (JP)

(72) Inventors: Yuichi Shibata, Shizuoka (JP);
Takayuki Yagi, Shizuoka (JP);
Hidetada Tanaka, Shizuoka (JP);
Misako Nakazawa, Shizuoka (JP);
Michihiko Hayakawa, Shizuoka (JP);
Takeshi Masuda, Shizuoka (JP);
Toshiaki Tsuda, Shizuoka (JP)

(73) Assignee: KOITO MANUFACTURING CO., LTD., Tokyo (JP)

( * ) Notice: Subject to any disclaimer, the term of this patent is extended or adjusted under 35 U.S.C. 154(b) by 0 days.

(21) Appl. No.: 14/823,729

(22) Filed: Aug. 11, 2015

(65) Prior Publication Data
US 2016/0039286 A1 Feb. 11, 2016

(30) Foreign Application Priority Data

Aug. 11, 2014 (JP) .................................. 2014-163379

(51) Int. Cl.
*B60K 35/00* (2006.01)

(52) U.S. Cl.
CPC ...... *B60K 35/00* (2013.01); *B60K 2350/1056* (2013.01); *B60K 2350/1084* (2013.01); *B60K 2350/2047* (2013.01); *B60K 2350/2052* (2013.01); *B60K 2350/924* (2013.01)

(58) Field of Classification Search
None
See application file for complete search history.

(56) References Cited

U.S. PATENT DOCUMENTS

| 2006/0114125 | A1* | 6/2006 | Kubota | B60Q 1/24 340/905 |
| 2013/0154815 | A1 | 6/2013 | Min et al. | |
| 2014/0062685 | A1* | 3/2014 | Tamatsu | B60Q 5/005 340/425.5 |
| 2015/0224926 | A1* | 8/2015 | Mochizuki | B60R 1/00 701/36 |

FOREIGN PATENT DOCUMENTS

| EP | 1 659 029 A1 | 5/2006 |
| JP | 2009-184428 A | 8/2009 |

OTHER PUBLICATIONS

Office Action in counterpart French Patent Application No. 1557662 issued on Dec. 29, 2016 (8 pages).

* cited by examiner

*Primary Examiner* — Mussa A Shaawat
*Assistant Examiner* — Kyung Kim
(74) *Attorney, Agent, or Firm* — Osha Liang LLP

(57) ABSTRACT

A vehicle display system displays information on a road surface. The vehicle display system includes an other-entity detector, an intersection detector, and a display device. The other-entity detector detects whether or not another entity approaches a vehicle mounted with the vehicle display system. The intersection detector detects whether or not the vehicle approaches an intersection. When the other-entity detector detects that said another entity approaches the vehicle or when the intersection detector detects that the vehicle approaches the intersection, the display device displays a predetermined shape in a predetermined region of a road surface ahead of the vehicle while moving the predetermined shape.

8 Claims, 8 Drawing Sheets

VEHICLE DISPLAY SYSTEM

CROSS REFERENCE TO RELATED APPLICATION(S)

This application is based on and claims priority under 35 U.S.C. §119 to Japanese Patent Application No. 2014-163379 filed on Aug. 11, 2014, the entire contents of which are incorporated herein by reference.

BACKGROUND

Technical Field

Exemplary embodiments of the invention relate to a vehicle display system that displays information on a road surface, etc.

Related Art

Recently, there are vehicle display systems that notify/warn another entity (such as a pedestrian and/or another vehicle) of vehicle information by illuminating (drawing) a graphic, a text, etc. on a road surface. For example, JP 2009-184428 A describes a vehicle display system that notifies/warns another entity who is about to go into an intersection that a vehicle is approaching, by displaying a graphic warning mark on a road surface of the intersection

SUMMARY

However, it is difficult to display a graphic and/or a text so that another entity can see the graphic and/or the text without the graphic and/or the text being deformed. Also, if the displayed graphic and/or text are distorted, it is concerned that the other entity may not recognize information indicated by the graphic and/or the text. Furthermore, generally, a driver of the vehicle is annoyed with the displaying to the other entity. Therefore, the displaying to the other entity may impair the comfort of the driver.

In view of the above circumstances, the invention has been made. Exemplary embodiments of the invention provide a vehicle display system that can offer such a display that another entity to be warned easily notices the display and the display does not make a driver of a vehicle feel strange.

(1) According to one exemplary embodiment, a vehicle display system displays information on a road surface. The vehicle display system includes an other-entity detector, an intersection detector, and a display device. The other-entity detector detects whether or not another entity approaches a vehicle mounted with the vehicle display system. The intersection detector detects whether or not the vehicle approaches an intersection. When the other-entity detector detects that said another entity approaches the vehicle or when the intersection detector detects that the vehicle approaches the intersection, the display device displays a predetermined shape in a predetermined region of a road surface ahead of the vehicle while moving the predetermined shape.

With this configuration, when another entity such a pedestrian or another vehicle and a vehicle come close to each other or when the vehicle approaches an intersection, the predetermined shape is dynamically displayed on a road ahead of the vehicle. The dynamic display more attracts the visual attention of the pedestrian or the other vehicle than static display. Therefore, the pedestrian or the other vehicle can more easily notice that the vehicle approaches him/her or the other vehicle. At the same time, the annoyance to the driver of the vehicle can be reduced during driving because the display is performed intermittently.

(2) In the system of (1), the predetermined shape may be a bar shaped mark extending in front and rear directions in the predetermined region. The display device may move the predetermined shape in right and left directions in the predetermined region. With this configuration, the simple shape is displayed to reciprocate. Therefore, the above-described advantageous effects can be achieved without consideration being given to distortion in drawing the predetermined shape.

(3) In the system of any one of (1) to (2), it may be stopped to display the predetermined shape at a center portion of a running lane of the vehicle. With this configuration, strange feeling that flickering may give the driver of the vehicle C can be reduced.

(4) In the system of any one of (1) to (2), an amount of light with which the predetermined shape at a center portion of a running lane of the vehicle is illuminated may be lower than that of light with which the predetermined shape (M) at right and left portions of the running lane (CR) is illuminated. With this configuration, strange feeling that flickering may give the driver of the vehicle C can be reduced.

(5) In the system of (1), the predetermined shape may be a bar shaped mark extending in right and left directions in the predetermined region. The display device may move the predetermined shape forwards in the predetermined region. With this configuration, the simple shape is displayed to move forward. Therefore, the above-described advantageous effects can be achieved without consideration being given to distortion in drawing the predetermined shape.

(6) In the system of any one of (1) and (5), a moving speed of the predetermined shape may increase toward a front end of the predetermined region. With this configuration, the predetermined shape is displayed with an increase in moving speed as the predetermined shape is further away from the vehicle. Therefore, the other entity is prompted to pay attention at an early stage of the approach of the vehicle.

(7) In the system of (5), a width of the predetermined shape may increase toward a rear end of the predetermined region. With this configuration, information regarding a distance to the vehicle can be informed to the other entity.

(8) In the system (1), the predetermined shape may be moved from a central portion of the predetermined region toward sides portions of the predetermined region. With this configuration, the simple shape is displayed to spread out. Therefore, the above-described advantageous effects can be achieved without consideration being given to distortion in drawing the predetermined shape.

(9) In the system of any one of (1) to (7), contrast between the predetermined shape and a light distribution pattern formed by headlamps of the vehicle may be set so that the predetermined shape is displayed as a relatively brighter portion than the light distribution pattern. With this configuration, strange feeling that the driver of the vehicle may have can be further reduced. Also, the predetermined shape appears to the other entity to flash. Therefore, the other entity can more easily notice the predetermined shape.

Exemplary embodiments of the invention provide the vehicle display system which can offer such a display that another entity to be warned easily notices the display and the display does not make a driver of a vehicle feel strange.

DETAILED DESCRIPTION

Exemplary embodiments of the invention will be described below with reference to the accompanied drawings.
(Overall Configuration)

Figure 1:
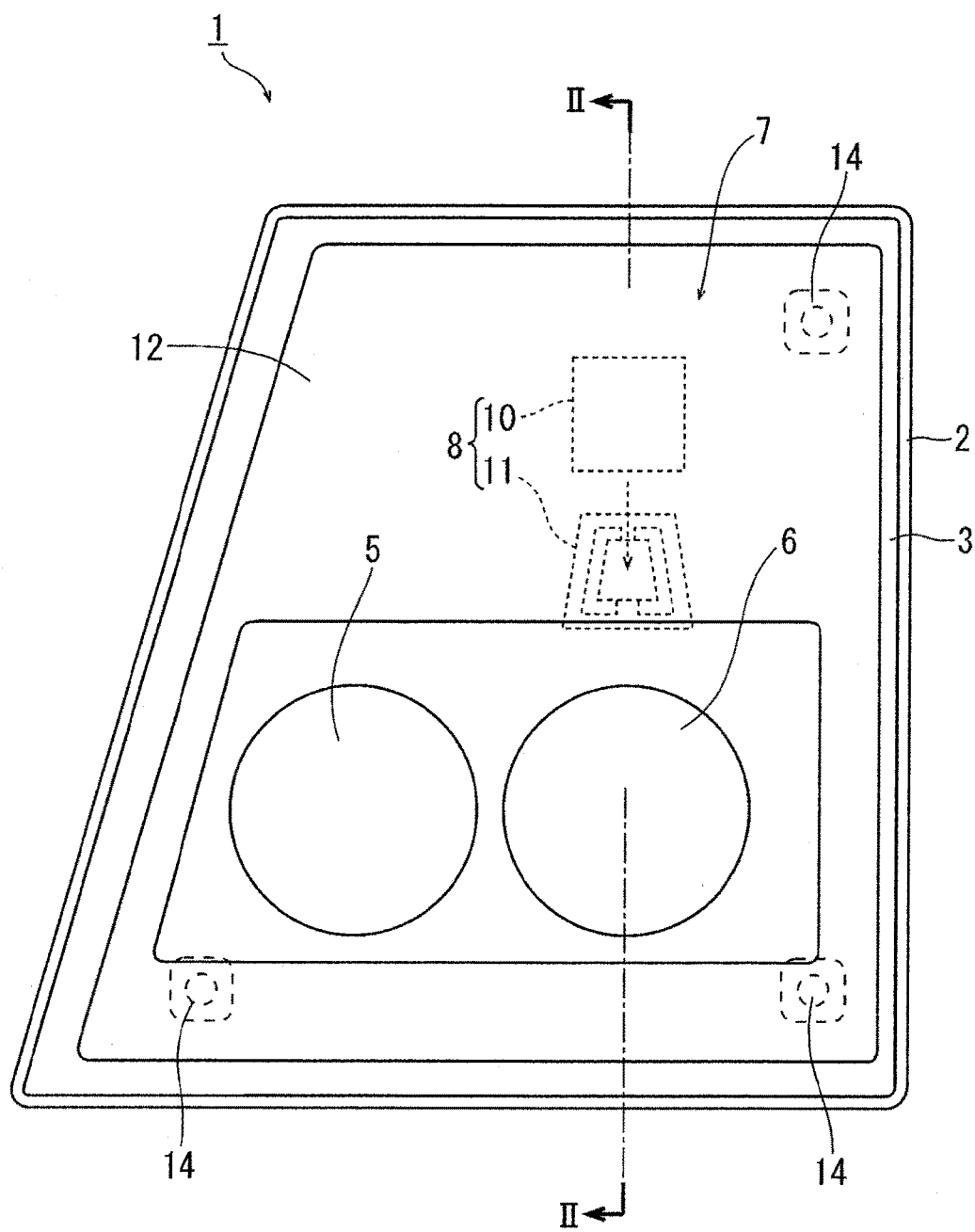
FIG. 1 is a front view of a vehicle lamp including a vehicle display system according to an exemplary embodiment of the invention.
Figure 2:
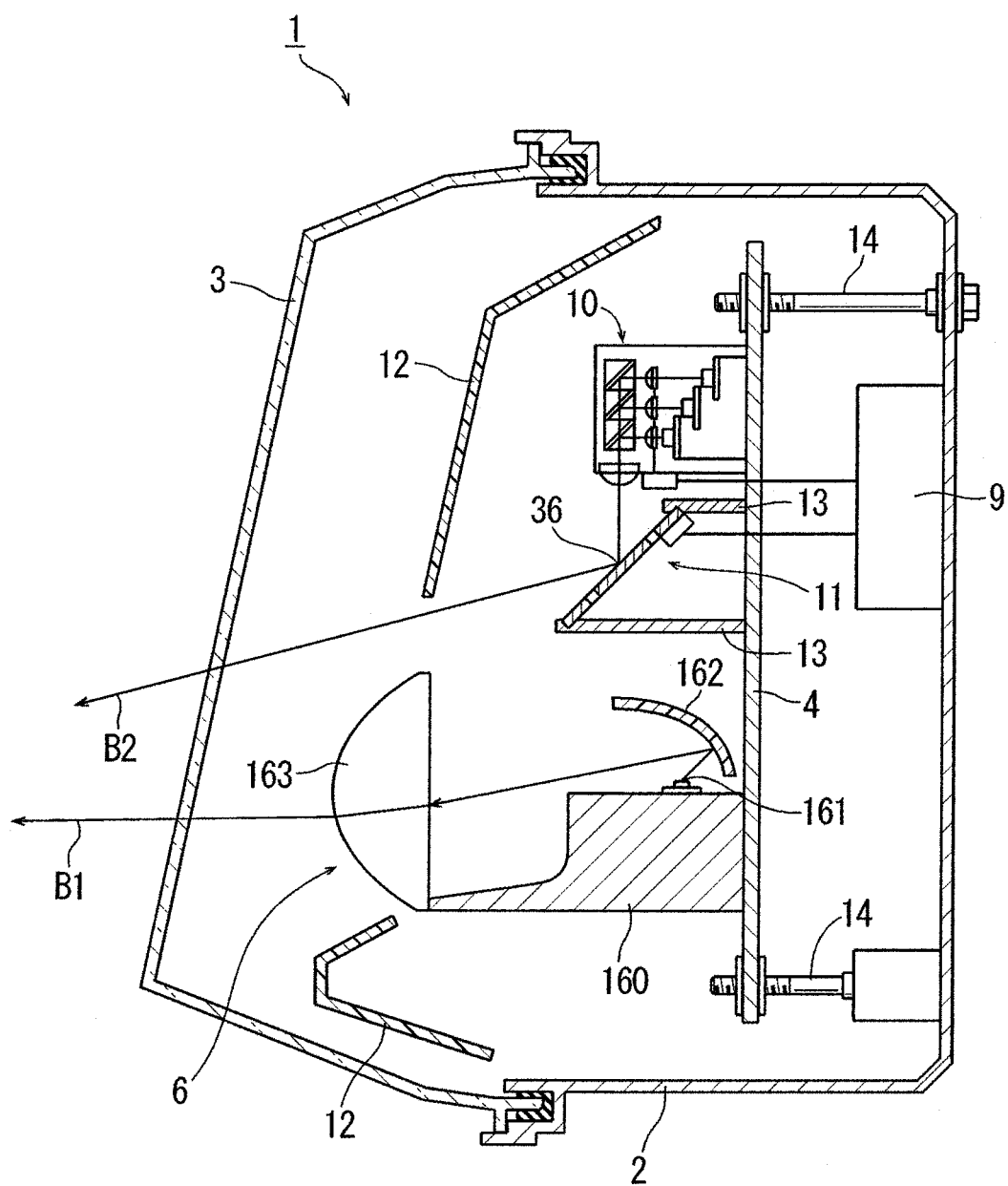
FIG. 2 is a vertical cross-section view of a vehicle lamp.

FIG. 1 is a front view of a vehicle lamp 1 according to an exemplary embodiment of the invention. FIG. 2 is a vertical cross-section view of the vehicle lamp 1 (a cross-section view taken along a line II-II in FIG. 1). A vehicle display system 7 is included in the vehicle lamp 1 of a vehicle C. The vehicle lamp 1 is a headlamp provided at each of the left and right of a front part of the vehicle C. In the following description, one example of a right side headlamp will described. Also, in the following description about the configuration of the vehicle lamp 1, "up," "down," "right," and "left" will indicate a "upward direction," a "downward direction," a "right direction," and a "left direction" with reference to a state in which the vehicle lamp 1 mounted in the vehicle C is viewed from the front side of the vehicle C (the state shown in FIG. 1).

The vehicle display system 7 may be mounted in the left headlamp. Alternatively, the vehicle display systems 7 may be mounted in both of the left and right front headlamps and form a dynamic mark M having a predetermined shape (which will be described later) in synchronization with each other. The vehicle display system 7 is also not limited to such a configuration that the vehicle display system is provided inside a lamp chamber of the vehicle lamp 1. Alternatively, the vehicle display system 7 may be disposed outside the vehicle lamp 1. Specifically, the vehicle display system 7 may be fixed to a roof of the vehicle C so as to face forwards.

As shown in FIGS. 1 and 2, the vehicle lamp 1 includes a lamp body 2 having a box shape, a front cover 3, a high beam light source unit 5, a low beam light source unit 6, and the vehicle display system 7. The lamp body 2 is formed with an opening portion. The front cover 3 is attached to the opening portion of the lamp body 2. The front cover 3 is made from a transparent resin, glass, or the like. The lamp body 2 and the front cover 3 define a lamp chamber. The high beam light source unit 5, the low beam light source unit 6, and the vehicle display system 7 are housed in the lamp chamber. The high beam light source unit 5 forms a high beam light distribution pattern. The low beam light source unit 6 forms a low beam light distribution pattern.

The high beam light source unit 5 and the low beam light source unit 6 may include a reflector type lamp unit and/or a projection type lamp unit. Types of the lamp units provided in the high beam light source unit 5 and the low beam light source unit 6 are not specifically limited. The configuration of the low beam light source unit 6 shown in FIG. 2 is just an example. In this example, the low beam light source unit 6 is of a projection type lamp unit and includes an LED 161, a reflector 162, and a projection lens 163. An arrow B1 in FIG. 2 indicates a part of light emitted by the low beam light source unit 6. The high beam light source unit 5 and the low beam light source unit 6 are fixed to a metal vertical bracket 4 by a horizontal bracket 160 or the like. The metal vertical bracket 4 serves as a support member for the high beam light source unit 5 and the low beam light source unit 6. The horizontal bracket 160 serves as a shade. The vertical bracket 4 is fixed to the lamp body 2 at three corner portions by aiming screws 14. An optical axis of the vehicle lamp 1 is adjustable in the upward, downward, right and left directions by rotating the aiming screws 14.

An extension member 12 is provided in the lamp chamber and in front of the high beam light source unit 5, the low beam light source unit 6, and (a display device 8 of) the vehicle display system 7 which will be described later. The extension member 12 is formed with an opening portion that allows light emitted from the high beam light source unit 5 and the low beam light source unit 6 to travel (propagate) toward the front side of the vehicle lamp 1. The extension member 12 serves as a blind member.
(Vehicle Display System)

The vehicle display system 7 includes a controller 9 and the display device 8. The controller 9 includes an other-entity detection section 56 and an intersection detection section 57. The other-entity detection section 56 if a pedestrian, another vehicle, and/or the like (which will be referred to as "another entity") approaches the vehicle C. The intersection detection section 57 detects if the vehicle C approaches an intersection. The display device 8 includes a laser light source unit 10 and a scanning mechanism 11. The laser light source unit 10 and the scanning mechanism 11 operate when the other-entity detection section 56 detects that another entity approaches the vehicle C or when the intersection detection section 57 detects that the vehicle C approaches an intersection.
(Display Device)

At first, description on the display device 8 will be given. The display device 8 includes the laser light source unit 10 and the scanning mechanism 11 which operate under control of the controller 9 (which will be described later).
(Laser Light Source Unit)

Figure 3:
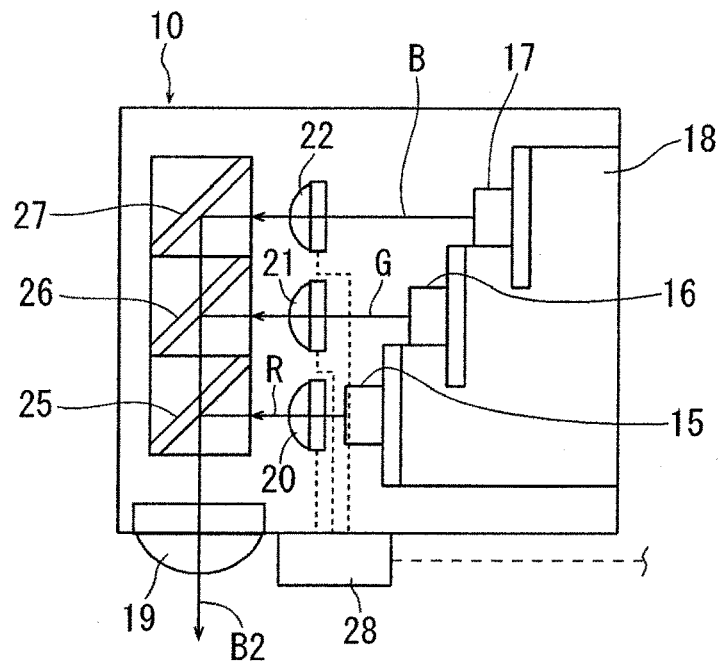
FIG. 3 is a side view of a laser light source unit.

FIG. 3 is a side view of the laser light source unit 10. It is noted that FIG. 3 illustrates the laser light source unit 10 so that an inside of the laser light source 10 appears to be seen through a casing. The laser light source unit 10 is a so-called RGB laser unit. In the laser light source unit 10, a first light source 15 that emits a red laser beam, a second light source 16 that emits a green laser beam, and a third light source 17 that emits a blue laser beam are fixed to a support block 18 through respective substrates thereof. The light emitted from the respective light sources 15, 16, 17 are collated into parallel beams by respective light collation lenses 20, 21, 22, are made incident onto respective dichroic mirrors 25, 26, 27, and pass through the dichroic mirrors 27, 26, 25 to thereby combine RGB light. Thus, a combined laser beam B2 makes up a white light beam. The laser beam B2 is reflected toward a light collation lens 19 provided on the casing of the laser light source unit 10, and emitted toward the outside of the laser light source unit 10. The light collation lens 19 is not an essential element. The laser light source unit 10 is fixed to a front surface of the vertical bracket 4 so that an optical axis of the laser light source unit 10 faces downward (see FIG. 2). The laser light source unit 10 includes a monitoring device 28 that controls outputs of the respective light sources 15, 16, 17. Thus, illumination intensities of the respective light sources 15, 16, 17 and an illumination intensity of the combined laser beam are monitored. The light source(s) of the laser light source unit 10 are not limited to such a configuration that three RGB light sources such as the light sources 15, 16, 17 are provided. Alternatively, the light source(s) of the laser light source unit 10 may have any configuration so long as they can generate white light. Examples thereof include (i) a single white light source, (ii) four light sources including an additional orange laser diode in addition to the R, G, and B light sources, and (iii) a configuration in which light emitted from a blue laser diode passes through a yellow fluorescent material. The light sources 15, 16, 17 may be laser devices other than laser diodes.

(Scanning Mechanism)

Figure 4:
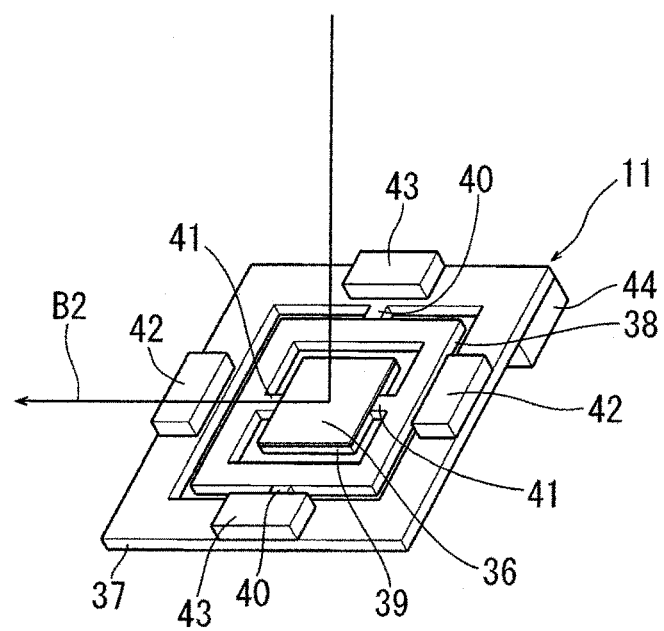
FIG. 4 is a perspective view of a scanning mechanism.

FIG. 4 is a perspective view of the scanning mechanism 11. The scanning mechanism 11 is a galvano mirror. Specifically, the scanning mechanism 11 includes a base portion 37, a first rotation body 38, a second rotation body 39, first torsion bars 40, second torsion bars 41, permanent magnets 42, 43, and a terminal portion 44.

The first rotation body 38 is supported by a pair of the first torsion bars 40, which are provided in a central opening portion of the base portion 37, so as to be rotatable rightward and leftward (in the horizontal direction) with respect to the base portion 37. The second rotation body 39 is supported by a pair of the second torsion bars 41, which are provided in a central opening portion of the first rotation body 38, so as to be rotatable upward and downward (in the vertical direction) with respect to the first rotation body 38. A reflector 36 is formed on a front surface of the second rotation body 39 by processing such as silver deposition or electroplating. A first coil (non shown) connected to the controller 9 is wired to the first rotation body 38. Also, a second coil (non shown) connected to the controller 9 is wired to the second rotation body 39. A pair of the permanent magnets 42 is provided on the base portion 37 at such positions that a line passing through the positions are orthogonal to a direction in which the first torsion bars 40 extend. A pair of the permanent magnets 43 is provided on the base portion 37 at such positions that a line connecting the positions is orthogonal to a direction in which the second torsion bars 41 extend. The first coil and the second coil are connected to the controller 9 through the terminal portion 44.

The first coil, the permanent magnets 42, the second coil and the permanent magnets 43 make up a scanning actuator 58 shown in FIG. 5 (which will be described later). The scanning actuator 58 changes an orientation of the reflector 36 upward, downward, rightward and leftward in accordance with the rotation of the first rotation body 38 and the rotation of the second rotation body 39 by individually changing (i) magnitudes of driving currents flowing in the first and second coils and (ii) directions in which the driving currents flow. The scanning mechanism 11 is fixed by horizontal holding plates 13, 13 so that the reflector 36 is located on the optical axis of the laser light source unit 10 and light emitted from the laser light source 10 is reflected forward of the vehicle lamp 1. As shown in FIG. 2, the horizontal holding plates 13, 13 that are fixed to the vertical bracket 4. The scanning mechanism 11 is fixed by the holding plates 13, 13 to be in a state where the scanning mechanism 11 inclines from a lamp lower front side toward a lamp upper rear side. The scanning mechanism 11 may adopt another scanning optical system such as a polygon mirror, or MEMS mirrors that can individually control angles of multiple minute mirrors using electric signals.

(Controller)

Figure 5:
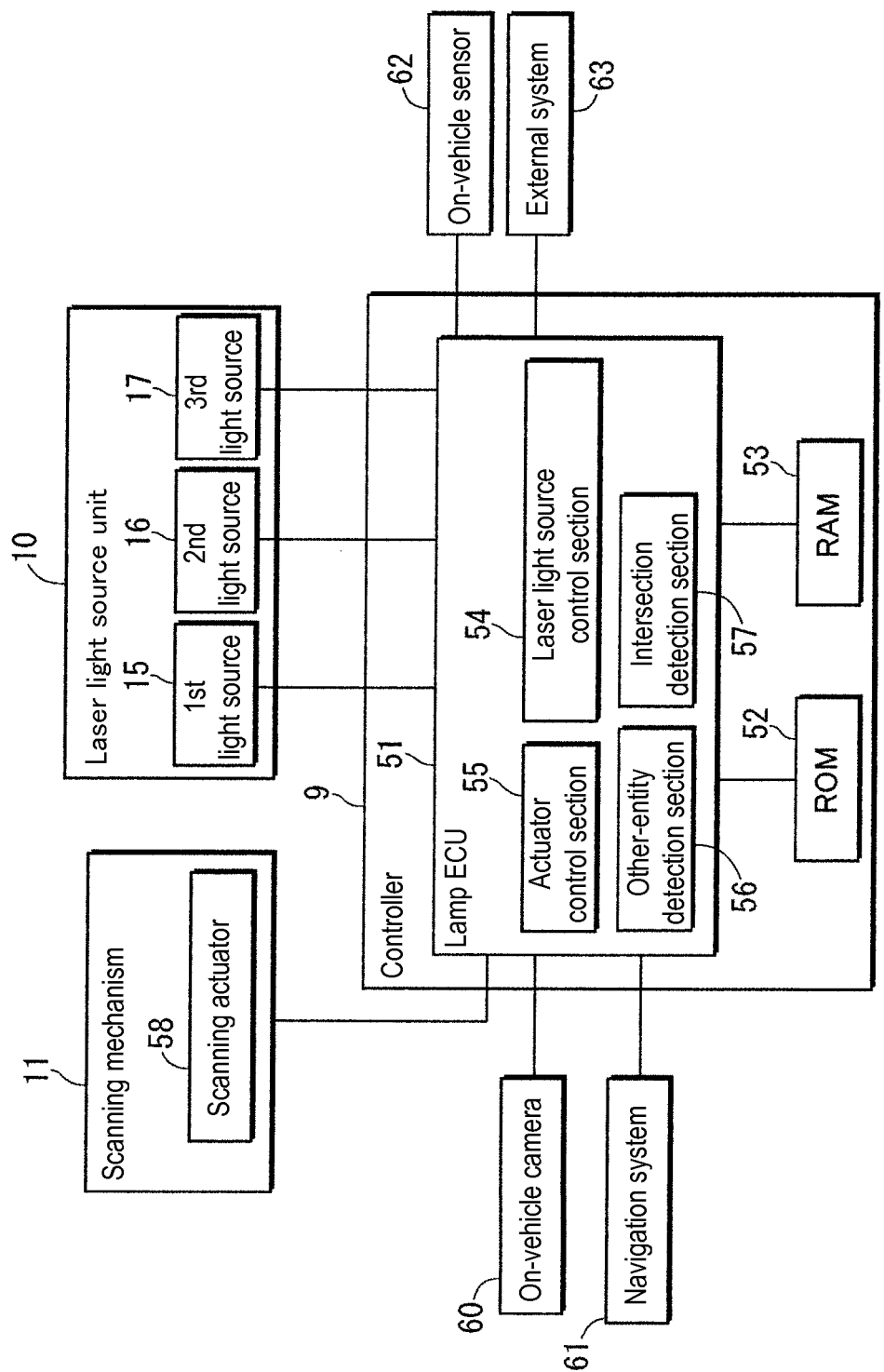
FIG. 5 is a functional block diagram for explaining a controller.

FIG. 5 is a functional block diagram for explaining the controller 9. The configuration in FIG. 5 is a mere example. The controller 9 may be implemented by semiconductor elements and electrical circuits in a hardware aspect and may be implemented by computer programs in a software aspect. One skilled in the art would appreciate that the controller 9 can be implementable by any of various combinations of the hardware and the software. The controller 9 includes a lamp ECU (electronic control unit) 51, a ROM 52, a RAM 53, etc. Various control programs are stored in the ROM 52. The lamp ECU 51 executes the various control programs stored in the ROM 52 using the RAM 53 to generate various control signals. The controller 9 is, for example, fixed to the lamp body 2.

The lamp ECU 51 can receive data detected by an on-vehicle camera 60, an on-vehicle sensor 62, and an external system 63, via wired communication, wireless communication and/or various other communications. The on-vehicle camera 60 and the on-vehicle sensor 62 are provided in the lamp chamber or in the vehicle C. Examples of the on-vehicle sensor 62 include a millimeter-wave radar. Examples of the external system 63 include an intelligent transport system, an intersection camera, and a monitoring camera. The lamp ECU 51 can receive data relating to a current position of the vehicle C from a car navigation system 61 provided in the vehicle C, via wired communication, wireless communication or other various communications. The lamp ECU 51, the on-vehicle camera 60, the on-vehicle sensor 62, and the external system 63 may make up the vehicle display system 7. Also, the lamp ECU 51, the on-vehicle camera 60, the on-vehicle sensor 62, and the external system 63 are examples of an other-entity detector and/or a intersection detector.

The lamp ECU 51 also includes a laser light source control section 54, an actuator control section 55, the other-entity detection section 56, and the intersection detection section 57.

The other-entity detection section 56 acquires/detects information indicating that another entity approaches the vehicle C, from devices (the on-vehicle camera 60, the on-vehicle sensor 62, and the external system 63) that sense presence of the other entity (entities).

The intersection detection section 57 acquires/detects information indicating that the vehicle C approaches an intersection, from the on-vehicle camera 60 or the car navigation system 61.

When the other-entity detection section 56 detects that another entity approaches the vehicle C or when the intersection detection section 57 detects that the vehicle C approaches an intersection, the laser light source control section 54 controls a color, an emission intensity and turning on/off of a laser beam of each of the light sources 15, 16, 17, based on the information acquired by the other-entity detection section 56 and the intersection detection section 57.

Also, when the other-entity detection section 56 detects that another entity approaches the vehicle C or when the intersection detection section 57 detects that the vehicle C approaches an intersection, the actuator control section 55 controls the scanning actuator 58 (i) based on information acquired by the other-entity detection section 56 and the intersection detection section 57 and (ii) in coordination with the control executed by the laser light source control section 54, so as to scan a scan region SA with the laser beam B2.

(Display by Vehicle Display System)

Figure 6:
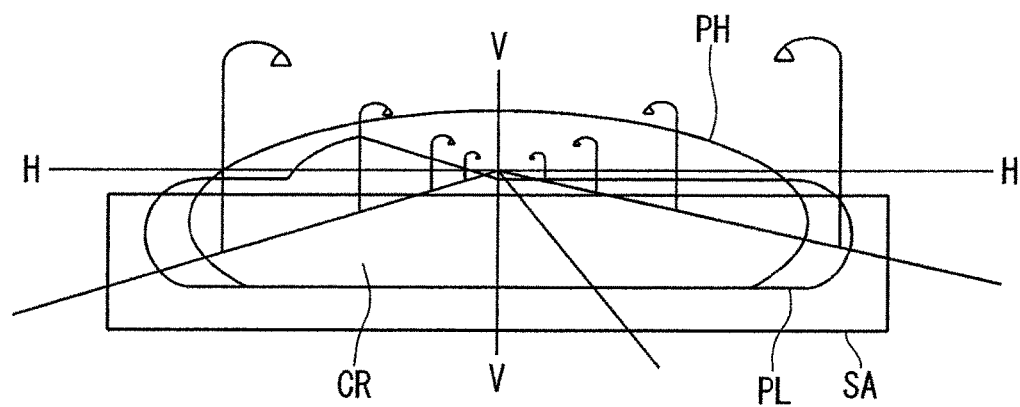
FIG. 6 is a diagram showing a light distribution formed by the vehicle lamp.
Figure 7:
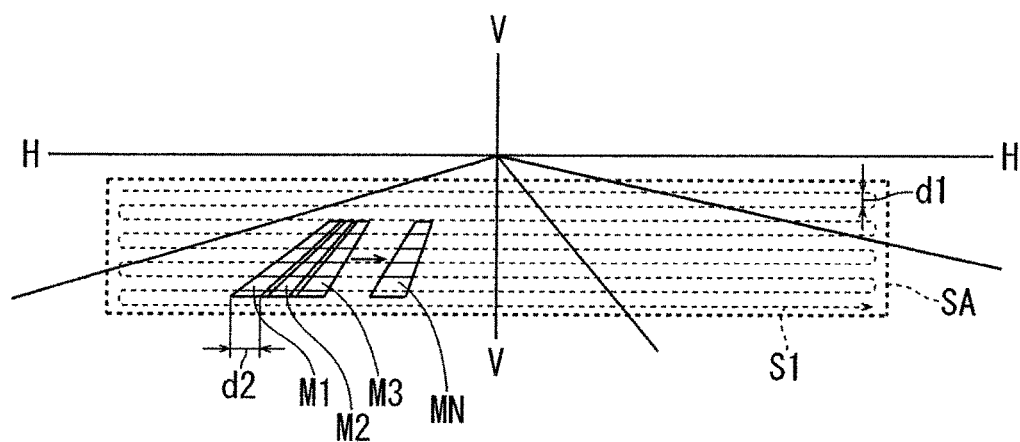
FIG. 7 is a diagram for explaining how the vehicle display system displays.

FIG. 6 is a diagram showing a light distribution formed by the vehicle lamp 1. FIG. 7 is a diagram for explaining how the vehicle display system 7 displays. FIG. 6 shows a virtual vertical screen that is virtually located at a position 25 m ahead of the vehicle lamp 1. The vehicle lamp 1 forms a low beam light distribution pattern PL by the low beam light source unit 6 and forms a high beam light distribution pattern PH by the high beam light source unit 5. Shapes of the low and low beam light distribution patterns PL. PH have been known. Thus, detailed explanation thereof will be omitted. A sign "CR" denotes a driving lane (road surface) in which the vehicle C is to run.

The vehicle display system 7 is set so as to be capable of scanning a rectangle scan region SA shown in FIG. 6. It is preferable to set the scan region SA of the vehicle display system 7 so as to cover a road shoulder and an adjacent lane to the lane CR and to cover from 10 meters to 50 meters ahead of the vehicle C. It is also preferable to set the scan region SA so that upper and lower ends of the scan region SA on the virtual vertical screen are in a range of –0.5° to –4° with respect to the line H-H and right and left ends of the scan region SA on the virtual vertical screen are in a range of –10° to 10° with respect to the line V-V.

At first, when the vehicle display system 7 is powered on, the controller 9 receives data from the on-vehicle camera 60, the on-vehicle sensor 62, the external system 63, and the car navigation system 61, and acquires information such as a position of an intersection 73 by means of the intersection detection section 57. At the same time, the controller 9 acquires information such as presence of a pedestrian 71, presence of another vehicle 72, a position of the pedestrian 71, and the position of the other vehicle 72, by means of the other-entity detection section 56. The vehicle display system 7 may be switched on automatically when the vehicle C is started or may be switched on through an operation switch provided in the vehicle C.

Next, when the other-entity detection section 56 detects that another entity approaches the vehicle C or when the intersection detection section 57 detects that the vehicle C approaches an intersection, the controller 9 drives the display device 8 to dynamically draw a mark M having a predetermined shape. A criteria (determination criteria) for detection as to whether or not another entity approaches the vehicle C and a criteria (determination criteria) for detection as to whether or not the vehicle C approaches an intersection may be set based on knowledge that one skilled in the art has. With regard to the detection made by the other-entity detection section 56, different criterion for determination as to whether or not another entity approaches the vehicle C may be provided for the case where the other entity is a pedestrian and the case where the other entity is another vehicle. Furthermore, the case where a pedestrian who approaches the vehicle C is one who crosses a road and the case where a pedestrian who approaches the vehicle C is one who walks along a road may employ different criterion for the determination.

FIG. 7 shows an example of the mark, which is dynamically drawn by the display device 8 when the other-entity detection section 56 detects that another entity approaches the vehicle C or when the intersection detection section 57 detects that the vehicle C approaches an intersection. A symbol S1 denotes one example of a scanning line. When scanning the scan region SA, light emitted from the display device 8 is moved along the scanning line S1. The scanning mechanism 11 swings the reflector 36 based on a control signal from the actuator control section 55, and scans the scan region SA1 horizontally at a high speed while shifting a position of the emitted light downward by a minimum distance d1. In coordination therewith, the laser light source unit 10 turns on a part or all of the first to third light sources (15 to 17) based on a control signal from the laser light source control section 43 during a period in which the scanning mechanism 11 scans an area where the mark M is to be drawn, so as to emit the laser beam B2. Also, the laser light source unit 10 turns off all the first to third light sources (15 to 17) during a period in which the scanning mechanism 11 scans outside the area where the mark M is to be drawn. In FIG. 7, dotted-line portions of the scan line S1 indicate portions which are scanned while the first to third light sources 15 to 17 are turned off. Also, solid-line portions of the scan line SA1 indicate portions which are scanned while a part or all of the first to third light sources are turned on. The vehicle display system 7 takes a round the scan region SA at a high speed. That is, it takes a quite short time for the vehicle display system 7 to scan the scan region SA once. Thus, the vehicle display system 7 can draw the mark M having an arbitrary shape by stacking beam emission points each of which is formed by one round (single scan). For example, if it is desired to move the mark M to the right, second scan subsequent to first scan draws a mark M2 that is shifted from a mark M1 formed by the first scan shifted to the right by a minimum distance d2. Then, third scan draws a mark M3 that is shifted from the mark M2 formed by the second scan to the right by the minimum distance d2. This process is repeated up to a mark Mn at a predetermined position. As a result, the mark M is displayed so that the mark M appears to move to the right in the predetermined region. There is no limitation to scanning with the scanning mechanism 11 in the horizontal direction, and suitable scanning may be adopted according to the shape and/or the movement of the mark M.

Suitable examples of the mark M, which is dynamically displayed by the vehicle display system 7, will be described below with reference to FIGS. 8A to 10. FIGS. 8A to 10 show the vehicle C and the mark M from above. Reference numeral 71 indicates a pedestrian, reference numeral 72 indicates another vehicle, and reference numeral 73 indicates an intersection. In the following description, front, rear, right and left are defined with reference to a state where the mark M is viewed from above (the state shown in FIGS. 8 to 10).

First Example

Figure 8A:
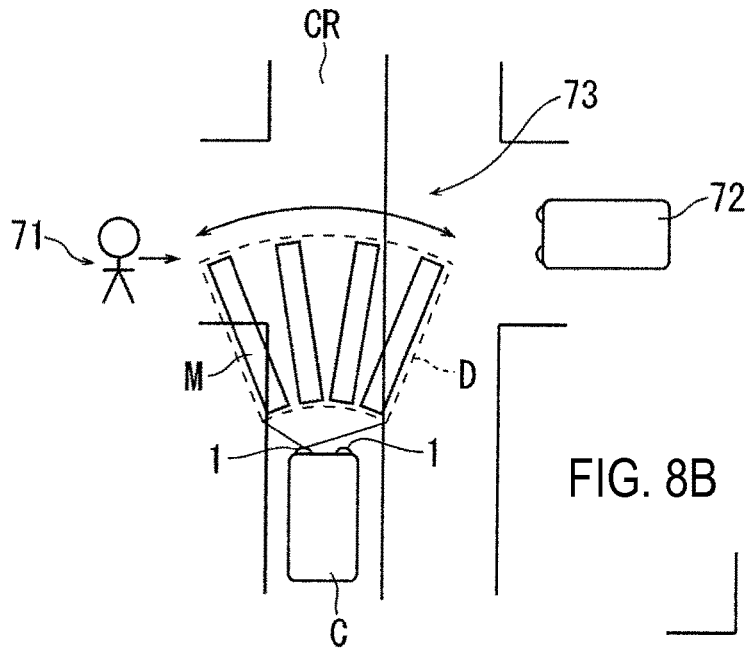
FIG. 8A is a diagram for explaining a first example of the vehicle display system.
Figure 8B:
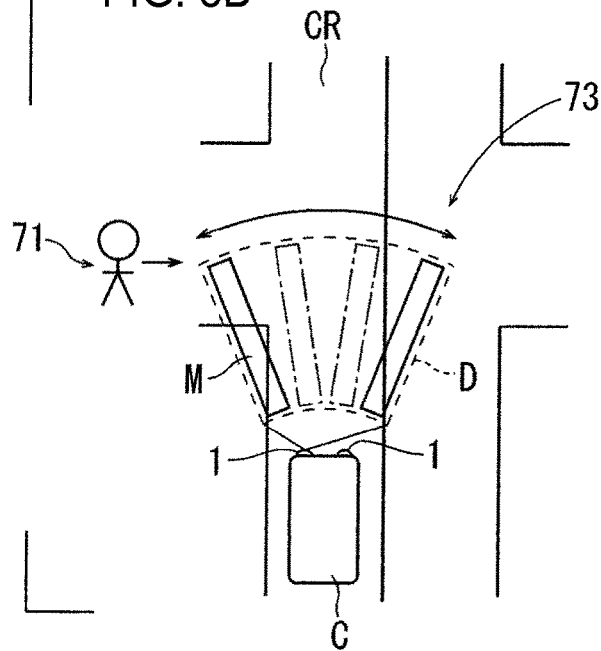
FIG. 8B is a diagram for explaining a modification of the first example.
Figure 8C:
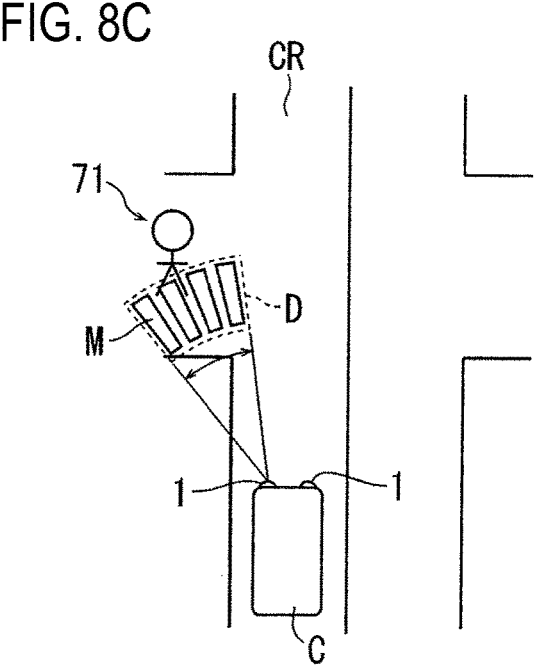
FIG. 8C is a diagram for explaining another modification of the first example.

FIG. 8A is an explanatory diagram of a first example of the vehicle display system. FIGS. 8B and 8C are modifications of the first example. In the first example, as shown in FIG. 8A, a predetermined region D is set to have a shape that spans a lane width of the running lane CR in which the vehicle C runs and that spreads out in a fan shape. A width of the predetermined region D in the right and left directions may be fixed and set in advance based on knowledge that one skilled in the art has. Alternatively, the lamp ECU 51 may detect lane marks, road shoulders, and the like from data acquired by the on-vehicle camera 60 and the like, specify a road width, and set the width of the predetermined region D in the right and left directions in accordance with the specified lane width. It is preferable that a length of the predetermined region D in the front and rear directions is set so as to cover a range from 10 meters to 15 meters ahead of the vehicle C. It is also preferable that the length of the predetermined region D in the front and rear directions is set so that a pedestrian who is further away than a distance at which the vehicle control can avoid collision between the vehicle C and the pedestrian even if, in the worst case, the pedestrian were to run out into the road.

The vehicle display system 7 detects whether or not the pedestrian 71 or the other vehicle 72 approach the vehicle C and detects whether or not the vehicle C approaches the intersection 73. Then, based on (i) information relating to the approach which is detected earliest or (ii) information relating to one of the pedestrian 71, the other vehicle 72, and the intersection 73 which is determined to be in a state where the one has the greatest need for warning, the vehicle display system 7 displays the mark M in the predetermined region D. The mark M has the bar shape that extends in the front and rear directions. The predetermined shape D has the fan shape. Sequential scanning in the scan region SA is repeated to thereby display the mark M in the fan-shaped predetermined region D while periodically moving the mark M in the right and left directions. It is preferable that the mark M is moved slowly in order to reduce annoyance to the driver of the vehicle C. For example, the mark M may be moved at about 2 cycles/second.

According to the first example, in a state where there is a concern that the pedestrian 71 and/or the other vehicle 72 approach the vehicle C, the mark M which is the longitudinal bar is displayed while being moved right and left. The dynamic display of the mark M more attracts the visual attention of the pedestrian 71 or the other vehicle 72 (a driver of the other vehicle 72) than static display of the mark M. Therefore, the pedestrian 71 and/or the driver of the other vehicle 72 readily notice that the vehicle C approaches him/her. At the same time, the annoyance to the driver of the vehicle C can be reduced during driving because display is performed intermittently. Moreover, the longitudinal bar shaped mark M is displayed so as to reciprocate in the right and left directions. Therefore, the attention of the pedestrian 71 and/or the driver of the other vehicle 72 are intuitively invited. Even if the mark M is drawn with some distortion, an advantageous effect that the attention is invited is not deteriorated.

As shown in FIG. 8B, the vehicle display system 7 may turn off or dimmer the laser light in a part of the predetermined region D. It is preferable that the vehicle display system 7 scans a region including a center portion of the running lane CR, that is, a center portion of the predetermined region D while turning off the laser light and that the vehicle display system 7 turns on the laser light only in a state where the vehicle display system 7 scans a region including right and left ends of the running lane CR, that is, right and left portions of the predetermined region D. Alternatively, the vehicle display system 7 turns on the laser light so that (i) an illumination intensity of the laser light in the center portion of the predetermined region D is weaker than that of the laser light in the right and left portions of the predetermined region D or (ii) a scanning speed in the center portion of the predetermined region D is slower than that in in the right and left portions of the predetermined region D. Specifically, the marks M indicated by dashed-dotted lines are not displayed (or are displayed with being dimmed) and the mark M indicated by solid lines are displayed. Thereby, the mark M becomes less visible to the driver of the vehicle C in a region to which the driver pays close attention. As a result, any strange feeling that flickering or the like may give the driver of the vehicle C can be reduced while the advantageous effect for the pedestrian 71 and the other vehicle 72 can be still maintained.

The predetermined region D is not limited to the lane CR. The predetermined region D may be in the vicinity of other entities based on information obtained by the other-entity detection section 56. As shown in FIG. 8C, the predetermined region D may be set to be at the foot of the pedestrian 71, and the mark M may be dynamically displayed in the predetermined region D.

Second Example

Figure 9A:
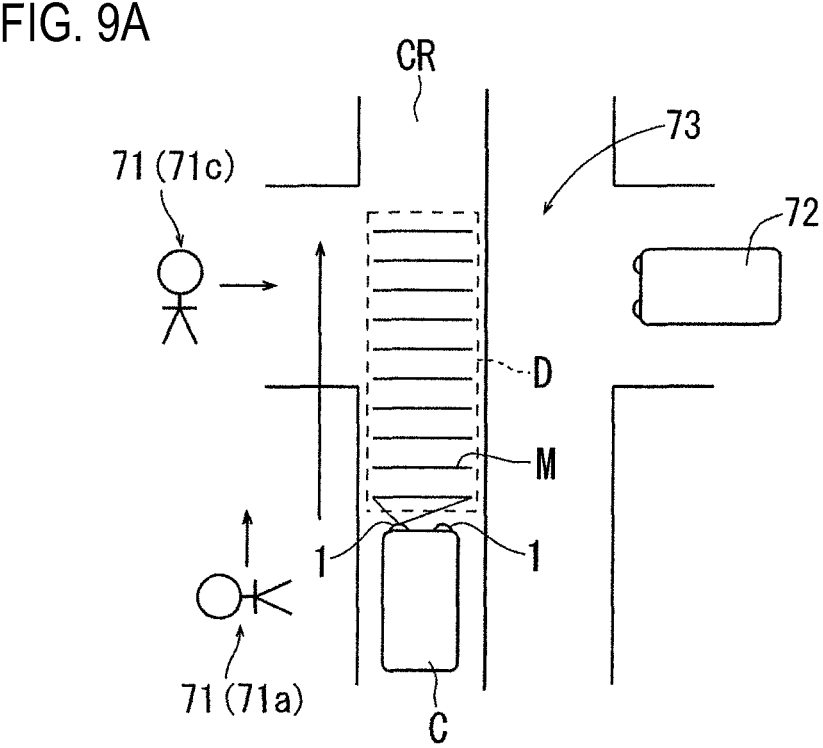
FIG. 9A is a diagram for explaining a second example of the vehicle display system.
Figure 9B:
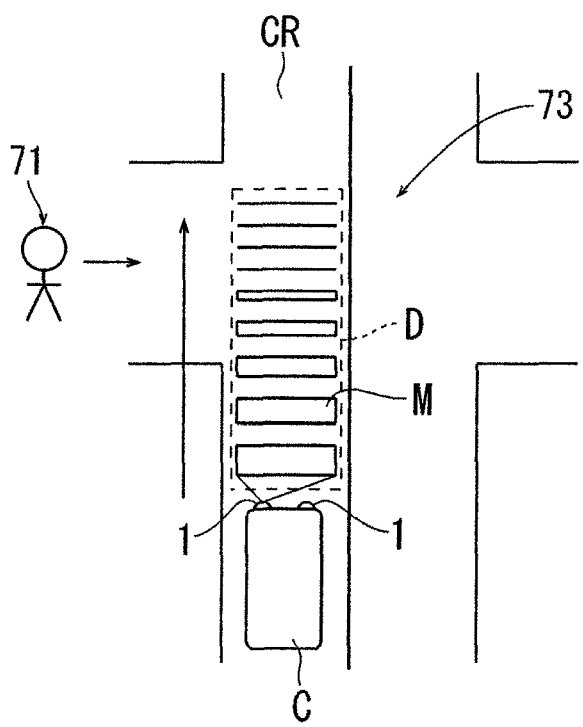
FIG. 9B is a diagram for explaining a modification of the second example.

FIG. 9A is a diagram to explain a second example of the vehicle display system 7. FIG. 9B illustrates a modification of the second example. In the second example, as shown in FIG. 9A, the predetermined region D is set to be a longitudinal rectangle shape in the running lane CR of the vehicle C. In this case, a width of the predetermined region D in the right and left directions and a length of the predetermined region D in the front and rear directions may be set fixedly or variably. For example, it is preferable that the predetermined region D is set to be in a range from 10 meters to 50 meters ahead of the vehicle C and have 3 meters in width.

The vehicle display system 7 detects whether or not a pedestrian 71 and/or another vehicle 72 approach the vehicle C and detects whether or not the vehicle C approaches an intersection 73. Based on (i) information relating to the approach which is detected earliest or (ii) information relating to one of the pedestrian 71, the other vehicle 72, and the intersection 73 which is determined to be in a state where the one has the greatest need for warning, the vehicle display system 7 displays the mark M in the predetermined region D. The mark M is a lateral bar extending in the right and left directions, in the longitudinal rectangle shaped predetermined region D. Sequential scanning in the scan region SA is repeated to thereby display the mark M in the longitudinal rectangle shaped predetermined region D while periodically moving the mark M in a single direction from the rear side to the front side.

According to the second example, in a state where there is a concern that the pedestrian 71 and/or the other vehicle 72 approach the vehicle C, the mark M which is the lateral bar is displayed while being moved forward. The dynamic display of the mark M more attracts the visual attention of the pedestrian 71 or the other vehicle 72 (a driver of the other vehicle 72) than static display of the mark M. Therefore, the pedestrian 71 and/or the driver of the other vehicle 72 readily notice that the vehicle C approaches him/her. At the same time, the annoyance to the driver of the vehicle C can be reduced during driving because display is performed intermittently. Moreover, the lateral bar shaped mark M is displayed so as to move forward. Therefore, the attention of the pedestrian 71 and/or the driver of the other vehicle 72 are intuitively invited. Even if the mark M is drawn with some distortion, an advantageous effect that the attention is invited is not deteriorated.

In the second example, it is preferable that the vehicle display system 7 displays the mark M with a display speed (at which the mark M is moved forward) that gradually increases toward a front end the predetermined region D. Thereby, the mark M is displayed with an increase in moving speed as the mark M is further away from the vehicle C. Therefore, the pedestrian 71 and/or the driver of the other vehicle 72 are prompted to pay attention at an early stage of the approach of the vehicle C.

In the second example, as shown in FIG. 9B, it is preferable the vehicle display system 7 displays the lateral bar shaped mark M to have a broader width toward a rear end of the predetermined region D. Thereby, the pedestrian 71 and/or the driver of the other vehicle 72 can be aware of a distance to the vehicle C according to the thickness of the bar.

In the second example, the display speed of the mark M may be changed according to a position of the pedestrian 71, that is, whether the pedestrian 71 is a pedestrian 71c who is crossing the lane CR or a pedestrian 71a who is walking along the lane CR. In order to facilitate the pedestrian 71c to pay attention, the vehicle display system 7 displays the mark M for the pedestrian 71c at a higher display speed than a display speed at which the mark M for the crossing pedestrian 71a is displayed. There is a concern to unintentionally cause an unnecessary feeling of excessive pressure by displaying the mark M for the pedestrian 71A at the same speed as the mark M for the crossing pedestrian 71c is displayed. Therefore, the mark M for the crossing pedestrian 71c is displayed at a display speed corresponding to a speed at which the crossing pedestrian 71c is walking.

Third Example

Figure 10:
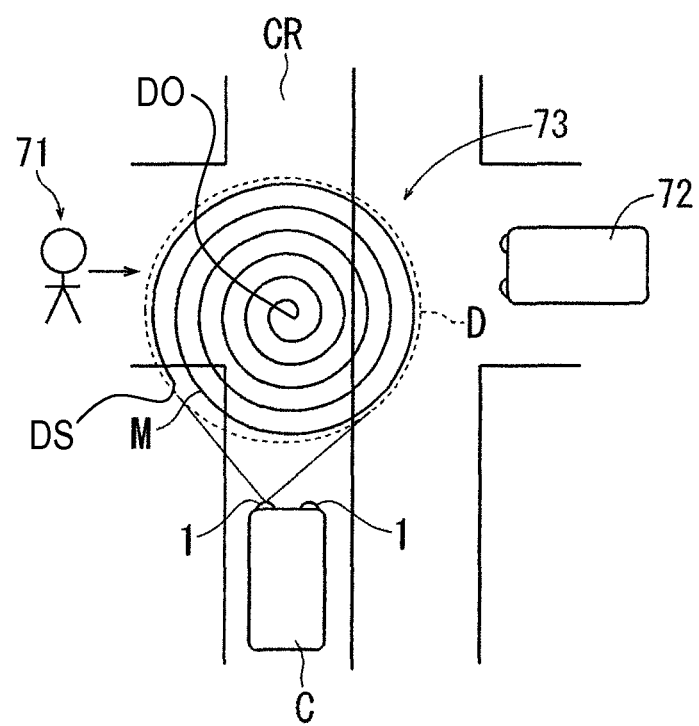
FIG. 10 is a diagram for explaining a third example of the vehicle display system.

FIG. 10 is a diagram to explain a third example of the vehicle display system 7. In the third example, as shown in FIG. 10, the predetermined region D has a circular shape in the intersection 73 detected by the intersection detection section 57. A range of the predetermined region D in this case may be fixed or variable. Upon detection of the intersection 73, the vehicle display system 7 displays the mark M having a spiral shape in the predetermined region D. Then, sequential scanning in the scan region SA is repeated to thereby display the mark M so that the mark M circles from a center DO of the predetermined region D toward a side portion DS of the predetermined region D. In another example, the dynamic mark M may be moved in accordance with running of the vehicle C. However, in the third example, the dynamic mark M may be fixedly displayed in the intersection 73 and not be moved in accordance with running of the vehicle C.

In the third example, in a state where there is a concern that the pedestrian 71 and/or the other vehicle 72 approach the vehicle C, the spiral shaped mark M is displayed so as to dynamically circle. The dynamic display of the mark M more attracts the visual attention of the pedestrian 71 or the other vehicle 72 (a driver of the other vehicle 72) than static display of the mark M. Therefore, the pedestrian 71 and/or the driver of the other vehicle 72 readily notice that the vehicle C approaches him/her. At the same time, the annoyance to the driver of the vehicle C can be reduced during driving because display is performed intermittently. Moreover, the spiral shaped mark M is displayed so as to circle. Therefore, even if the mark M is drawn with some distortion, an advantageous effect that the attention is invited is not deteriorated. The mark M may be a mark having a ripple pattern or a radiating pattern.

Other Modified Examples

It is preferable that the vehicle display system 7 executes the following control. That is, the vehicle display system 7 (i) causes the laser light source control section 54 to reduce an illumination intensity of the laser light source unit 10 in a region to which the driver of the vehicle C pays close attention or (ii) increases a scanning speed of the scanning mechanism 11 in the region to which the driver of the vehicle C pays close attention, to adjust a light amount so that the mark M is a slightly relatively bright portion as compared to a light distribution pattern(s) formed by the headlamp (light source units 5, 6). A difference in luminance between the mark M and the light distribution pattern(s) is decreased. Contrast between the mark M and the light distribution pattern(s) formed by the headlamp (light source units 5, 6) is intentionally reduced. Thereby, strange feeling that the driver of the vehicle C may have can be further reduced. The mark M appears to the pedestrian 71 and the other vehicle 72 (the driver of the other vehicle 72) to be controlled in a more complex fashion. Therefore, the pedestrian 71 and the other vehicle 72 (the driver of the other vehicle 72) would notice the mark M earlier. As a result, the advantageous effect that the attention is invited can be further enhanced.

The above described examples and modifications of the dynamic display are merely examples of the invention. The respective examples and the respective modifications may be combined in various ways based on the knowledge that one skilled in the art has. It should be noted that the exemplary embodiments of the dynamic display obtained by such combinations are included in the scope of the invention.

The vehicle display system 7 which dynamically displays the mark M employs, as the display device 8, the mechanism which scans with the laser light. However, the vehicle display system may employ another mechanism/configuration. For example, a swing mechanism formed with a light passing hole having a shape of the mark M may be illuminated with light-source light, and the mark M may be mechanically swung. Alternatively, plural light sources may be turned on in sequence.

What is claimed is:

1. A vehicle display system that displays information on a road surface, the vehicle display system comprising:
   an other-entity detector that detects whether or not another entity approaches a vehicle mounted with the vehicle display system;
   an intersection detector that detects whether or not the vehicle approaches an intersection; and
   a display device,
   wherein, when the other-entity detector detects that the another entity approaches the vehicle or when the intersection detector detects that the vehicle approaches the intersection, the display device displays a predetermined shape in a predetermined region of a road surface ahead of the vehicle while moving the predetermined shape,
   wherein the predetermined shape is a bar shaped mark extending in front and rear directions in the predetermined region, and
   wherein the display device moves the predetermined shape in right and left directions in the predetermined region.

2. The system of claim 1, wherein display of the predetermined shape is ceased at a center portion of a running lane of the vehicle.

3. The system of claim 1,
   wherein an amount of light with which the predetermined shape at a center portion of a running lane of the vehicle is illuminated is lower than that of light with which the predetermined shape at right and left portions of the running lane is illuminated.

4. The system of claim 1, wherein contrast between the predetermined shape and a light distribution pattern formed by headlamps of the vehicle is set so that the predetermined shape is displayed as a relatively brighter portion than the light distribution pattern.

5. A vehicle display system that displays information on a road surface, the vehicle display system comprising:
- an other-entity detector that detects whether or not another entity approaches a vehicle mounted with the vehicle display system;
- an intersection detector that detects whether or not the vehicle approaches an intersection; and
- a display device,
- wherein, when the other-entity detector detects that the another entity approaches the vehicle or when the intersection detector detects that the vehicle approaches the intersection, the display device displays a predetermined shape in a predetermined region of a road surface ahead of the vehicle while moving the predetermined shape,
- wherein the predetermined shape is a bar shaped mark extending in right and left directions in the predetermined region, and
- wherein the display device moves the predetermined shape forwards in the predetermined region.

6. The system of claim 5,
- wherein a moving speed of the predetermined shape increases toward a front end of the predetermined region.

7. The system of claim 5, wherein a width of the predetermined shape increases toward a rear end of the predetermined region.

8. A vehicle display system that displays information on a road surface, the vehicle display system comprising:
- an other-entity detector that detects whether or not another entity approaches a vehicle mounted with the vehicle display system;
- an intersection detector that detects whether or not the vehicle approaches an intersection; and
- a display device,
- wherein, when the other-entity detector detects that the another entity approaches the vehicle or when the intersection detector detects that the vehicle approaches the intersection, the display device displays a predetermined shape in a predetermined region of a road surface ahead of the vehicle while moving the predetermined shape, and
- wherein the predetermined shape is moved from a central portion of the predetermined region toward sides portions of the predetermined region.

* * * * *